United States Patent
Zhong et al.

(10) Patent No.: US 11,801,818 B2
(45) Date of Patent: Oct. 31, 2023

(54) MULTI-MODE HYDRAULIC BRAKING SYSTEMS AND CONTROL METHODS THEREOF

(71) Applicants: ZHEJIANG UNIVERSITY OF TECHNOLOGY, Zhejiang (CN); ZHEJIANG HAIHONG HYDRAULIC TECHNOLOGY CO., LTD., Zhejiang (CN)

(72) Inventors: Qi Zhong, Hangzhou (CN); Jun Wang, Taizhou (CN); Xianjian He, Taizhou (CN); Xingxing Wang, Taizhou (CN); Enguang Xu, Hangzhou (CN); Tiwei Jia, Hangzhou (CN); Cheng Yu, Hangzhou (CN); Junxian Wang, Hangzhou (CN)

(73) Assignees: ZHEJIANG UNIVERSITY OF TECHNOLOGY, Hangzhou (CN); ZHEJIANG HAIHONG HYDRAULIC TECHNOLOGY CO., LTD., Taizhou (CN)

( * ) Notice: Subject to any disclaimer, the term of this patent is extended or adjusted under 35 U.S.C. 154(b) by 0 days.

(21) Appl. No.: 18/192,630

(22) Filed: Mar. 29, 2023

(65) Prior Publication Data

US 2023/0311835 A1 Oct. 5, 2023

(30) Foreign Application Priority Data

Mar. 29, 2022 (CN) .......................... 202210323968.2

(51) Int. Cl.
*G06F 17/00* (2019.01)
*B60T 13/68* (2006.01)
*B60T 17/22* (2006.01)

(52) U.S. Cl.
CPC .......... *B60T 13/686* (2013.01); *B60T 17/222* (2013.01)

(58) Field of Classification Search
CPC ............................ B60T 13/686; B60T 17/222
(Continued)

(56) References Cited

U.S. PATENT DOCUMENTS

| | | | | |
|---|---|---|---|---|
| 4,503,678 A | * | 3/1985 | Wimbush | F16D 25/12 303/64 |
| 5,047,940 A | * | 9/1991 | Onaka | B60T 8/175 701/87 |

(Continued)

FOREIGN PATENT DOCUMENTS

| CN | 105857281 A | 6/2016 |
|---|---|---|
| CN | 106812939 A | 6/2017 |

(Continued)

OTHER PUBLICATIONS

IET Intelligent Trans Sys—2018—Wang—Multi-objective optimisation of electro hydraulic braking system based on MOEA D (Year: 2019).*

(Continued)

*Primary Examiner* — Ronnie M Mancho
(74) *Attorney, Agent, or Firm* — METIS IP LLC

(57) ABSTRACT

The present disclosure discloses multi-mode hydraulic braking systems and control methods thereof. The system includes a two-position three-way digital switch valve, an electromagnetic three-position three-way proportional reversing valve, a controller, a pressure detection system, a speed detection system, and a displacement detection system. The controller intelligently switches a digital braking mode, a composite braking mode, and an anti-lock braking mode after collecting a brake signal through the pressure detection system and speed detection system in real time.

(Continued)

The present disclosure integrates an electro-hydraulic proportional control technology with the electromagnetic three-position three-way reversing valve as a control element and a digital hydraulic technology with a digital switch valve as a control element and takes into account an anti-lock function on the basis of digital and composite braking modes to ensure safety of emergency braking and improves versatility of the braking system by the controller intelligently switching the operating modes.

6 Claims, 6 Drawing Sheets

(58) Field of Classification Search
USPC .......................................................... 701/70
See application file for complete search history.

(56) References Cited

U.S. PATENT DOCUMENTS

| | | | | |
|---|---|---|---|---|
| 6,572,202 B2* | 6/2003 | Watanabe | ............. | B60T 8/1755 303/182 |
| 8,444,230 B2* | 5/2013 | Ikematsu | ............. | B60T 8/4872 303/140 |
| 8,573,711 B2* | 11/2013 | Kato | ................. | B60T 8/3275 303/114.1 |
| 8,661,812 B2* | 3/2014 | Ganzel | ................. | B60T 7/042 60/554 |
| 8,960,811 B2* | 2/2015 | Morishita | ................ | B60T 1/10 303/3 |
| 8,991,939 B2* | 3/2015 | Nakamura | ............ | B60T 8/348 180/65.265 |
| 9,592,800 B2* | 3/2017 | Matoy | ................. | B60T 8/1708 |
| 9,988,028 B2* | 6/2018 | Oosawa | ................ | B60T 7/042 |
| 10,583,817 B2* | 3/2020 | Ganzel | ................ | B60T 13/662 |
| 10,814,853 B2* | 10/2020 | Ganzel | ................ | B60T 13/686 |
| 10,814,855 B1* | 10/2020 | Ganzel | ................ | F16K 33/00 |
| 11,142,178 B2* | 10/2021 | Ganzel | ................ | B60T 8/4081 |
| 11,414,090 B2* | 8/2022 | Kim | .................... | B60W 10/18 |
| 11,535,211 B2* | 12/2022 | Zhang | ................ | B60T 13/686 |
| 11,535,227 B2* | 12/2022 | Timm | ..................... | B60T 8/40 |
| 11,572,066 B2* | 2/2023 | Singh | ................ | B60W 30/143 |
| 11,667,272 B2* | 6/2023 | Zhang | ................ | F15B 19/002 73/1.72 |
| 2011/0184620 A1* | 7/2011 | Kato | ..................... | B60T 8/4081 701/70 |
| 2018/0022333 A1* | 1/2018 | Ganzel | ................ | B60T 13/686 303/155 |
| 2020/0114894 A1* | 4/2020 | Leiber | ................ | B60T 13/745 |
| 2020/0238967 A1* | 7/2020 | Zhang | ................ | B60T 13/745 |
| 2020/0339092 A1* | 10/2020 | Reuter | ..................... | B60T 8/36 |
| 2021/0070273 A1* | 3/2021 | Timm | ..................... | B60T 17/22 |
| 2021/0229645 A1* | 7/2021 | Leiber | ..................... | B60T 7/042 |
| 2022/0185246 A1* | 6/2022 | Szuck | ..................... | B60T 8/171 |
| 2022/0185274 A1* | 6/2022 | Singh | ................ | B60W 10/184 |
| 2022/0379865 A1* | 12/2022 | Leiber | ..................... | B60T 8/885 |
| 2023/0112527 A1* | 4/2023 | Timm | ................ | B60T 13/686 701/70 |

FOREIGN PATENT DOCUMENTS

| | | |
|---|---|---|
| CN | 107200001 A | 9/2017 |
| CN | 108657219 A | 10/2018 |
| CN | 210737634 U | 6/2020 |
| WO | 2013083234 A1 | 6/2016 |

OTHER PUBLICATIONS

Cao, Qinghua et al., Simulation of Digital Electro-hydraulic Proportional Control System of Working Device for Loader, Journal of Nanchang Institute of Technology, 25(3): 23-26, 2006.
First Office Action in Chinese Application No. 202210323968.2 dated Sep. 27, 2022, 15 pages.
Decision to Grant a Patent in Chinese Application No. 202210323968.2 dated Jan. 28, 2023, 3 pages.

* cited by examiner

MULTI-MODE HYDRAULIC BRAKING SYSTEMS AND CONTROL METHODS THEREOF

CROSS-REFERENCE TO RELATED APPLICATION

This application claims priority of Chinese Patent Application No. 202210323968.2, filed on Mar. 29, 2022, the entire contents of which are entirely incorporated herein by reference.

TECHNICAL FIELD

The present disclosure relates to the field of hydraulic braking, and in particular, to multi-mode hydraulic braking systems and control methods thereof.

BACKGROUND

A braking system refers to a series of devices that forcibly reduce a driving speed of a vehicle and consists of four parts: an energy supply device, a control device, a transmission device, and a brake. A main function is to slow down or even stop a moving vehicle and keep the speed of a downhill vehicle stable. However, due to the different working conditions of various types of vehicles, a high requirement is made to the versatility of the braking system. Especially in working conditions of a harsh working environment, variable load, and huge motion inertia, an extremely high requirement is made to the braking performance of the brake system.

At present, the highest technology of full hydraulic braking is an electro-hydraulic proportional braking control technology. As the proportional valve has a median dead zone, a pressure response of the brake is slow and a braking process lags behind. There is an internal leakage in the proportional valve, which makes it difficult to stabilize the brake pressure for a long time, causing a low control accuracy. At the same time, a spool valve structure of the proportional valve has the extremely high requirement on oil cleanliness. An oil pollution may cause the spool to stick, which causes the brake to fail to brake effectively, a poor reliability, and difficulty in meeting a requirement of full hydraulic braking under a complex working condition. A digital hydraulic technology adopts a digital switch valve as a core control element, which has a fast frequency response, and a discrete fluid generated by a high-frequency opening and closing may assimilate an effect of continuous fluid control after fusion in a pipeline. In this way, the control accuracy is high and there are only two states, namely opening and closing, making the control element not sensitive to the cleanliness of the oil, so the anti-pollution ability is stronger and the response is faster. However, the flow rate of the digital switch valve is small and there is often a problem of insufficient flow rate when braking with a great flow rate is required.

SUMMARY

A purpose of the present disclosure is to overcome deficiencies of the prior art and provide multi-mode hydraulic braking systems and control methods thereof. In the present disclosure, an electro-hydraulic proportional control technology with an electromagnetic three-position three-way reversing valve as a control element is integrated with a digital hydraulic technology with a digital switch valve as a control element and an anti-lock function is taken into account on the basis of digital and composite braking modes, which ensures safety of emergency braking. The operating modes are intelligently switched through a controller, which improves versatility of the braking system.

The present disclosure first provides a multi-mode hydraulic braking system, including a two-position three-way digital switch valve, an electromagnetic three-position three-way proportional reversing valve, a controller, a pressure detection system, a speed detection system, and a displacement detection system.

The controller is respectively connected to the displacement detection system, the pressure detection system, and the speed detection system to obtain detection signals corresponding to the displacement detection system, the pressure detection system, and the speed detection system, the controller is connected to the electromagnetic three-position three-way proportional reversing valve and the two-position three-way digital switch valve to respectively control the electromagnetic three-position three-way proportional reversing valve and the two-position three-way digital switch valve, and the controller is also configured to control an external liquid filling system.

The displacement detection system is configured to obtain a displacement signal of an external pedal device, the pressure detection system is configured to obtain a brake oil chamber pressure signal of an external brake, and the speed detection system is configured to obtain a wheel speed.

Oil inlets of the electromagnetic three-position three-way proportional reversing valve and the two-position three-way digital switch valve are connected to the external liquid filling system, the oil inlet of the two-position three-way digital switch valve is also connected to an accumulator, oil outlets of the electromagnetic three-position three-way proportional reversing valve and the two-position three-way digital switch valve are connected to a brake oil chamber of the external brake, and oil return ports of the electromagnetic three-position three-way proportional reversing valve and the two-position three-way digital switch valve are connected to an external oil tank.

Further, the controller is further configured to obtain a pressure signal of the external accumulator.

The present disclosure further discloses a control method of a multi-mode hydraulic braking system, including:

1) the controller collecting the detection signals corresponding to the displacement detection system, the pressure detection system, and the speed detection system in real time through the displacement detection system, the pressure detection system, and the speed detection system;

2) the controller determining a current brake oil chamber pressure signal according to a feedback signal of the pressure detection system when the controller receives a braking command signal of the displacement detection system;

2.1) the controller transmitting a first optimal driving frequency $f_1$ and a first optimal duty cycle $\beta$ to the digital switch valve at time t1 when determining that the current brake oil chamber pressure signal meets a set light load threshold and the controller transmitting a valve opening $\gamma$ to keep the proportional valve in median function;

pressure building being started at time t2 because of a short response lag time and a high frequency response of the digital switch valve, the oil being first input from a port P of the digital switch valve and input to the brake through the digital switch valve; the controller calculating a second optimal driving frequency $f_1'$ and a second duty cycle $\beta'$ of the digital switch valve when a brake pressure reaches a target brake pressure $P_0$ and excess oil returning to the oil tank through the oil return port T of the digital switch valve to stabilize the brake chamber pressure at the target brake pressure $P_0$ to achieve precise regulation of the brake pressure;

2.2) the controller transmitting the first optimal driving frequency $f_1$ and the first optimal duty cycle $\beta$ to the digital switch valve at time t1 when determining that the current brake pressure signal meets a set heavy load threshold and the controller transmitting the valve opening $\gamma$ to adjust a size of the valve opening of an oil inlet line of the proportional valve;

pressure building being started at time t2 because of the short response lag time and the high frequency response of the digital switch valve; at the same time, the proportional valve starting to respond and participating in braking and pressure building after crossing a dead zone, the oil being divided into two lines, and the two lines of oil finally entering the brake after one line passes through the digital switch valve and the other line passes through the proportional valve; and the controller calculating the second optimal driving frequency $f_1'$ and the second duty cycle $\beta'$ of the digital switch valve and an optimal valve opening $\gamma'$ of the proportional valve when the brake pressure reaches the target brake pressure $P_0$ and the excess oil returning to the oil tank through the oil return port to achieve high dynamic response and high precision control of the target brake pressure $P_0$;

2.3) in the operating mode of 2.1), an anti-lock mode being activated when the controller detects that the brake pressure is too great and reaches a lock pressure $P_1$ and the speed detection system detects an emergency brake signal, the controller transmitting an optimal low-frequency driving frequency $f_2$ and a third duty cycle $\beta''$ to the digital switch valve, and cadence braking being turned on for emergency braking;

in the operating mode 2.2), the anti-lock mode being activated when the controller detects that the brake pressure is too great and reaches the lock pressure $P_1$ and the speed detection system detects the emergency brake signal, the controller transmitting the valve opening $\gamma$ to the proportional valve to keep the proportional valve in median function, the controller transmitting the optimal low-frequency driving frequency $f_2$ and and the third duty cycle $\beta''$ to the digital switch valve, and cadence braking being turned on for emergency braking.

Further, in the operating modes 2.1) and 2.2), the driving frequencies $f_1$ and $f_1'$ are in a range of 100-300 Hz and the duty cycles $\beta$, $\beta'$, and $\beta''$ are in a range of 0%-100%.

Further, in the operating mode 2.3), the driving frequency $f_2$ is in a range of 10 Hz-20 Hz.

Further, a selection interval of the light load threshold is 6 MPa-12 MPa, a selection interval of the heavy load threshold is greater than 12 MPa, and the emergency brake signal means that a vehicle movement speed is reduced to smaller than 20% of an original movement speed within 1.5 s.

Further, when a pressure of the accumulator detected by the controller is inadequate, the controller transmits a control signal $\alpha$ to the liquid filling system and the liquid filling system fills the accumulator with liquid to supplement the pressure.

Compared with the prior art, the present disclosure has following beneficial effects.

The present disclosure proposes a structure that combines the digital switch valve with a traditional proportional valve, which solves problems of slow response, poor stability, etc. of a traditional braking technology.

The present disclosure adopts a digital braking mode, which reduces the braking response time and an effect of precise regulation of the brake pressure is achieved through a high-frequency opening and closing of the digital switch valve.

The present disclosure adopts a composite braking mode, which takes into account the fast response and stability while braking with a great flow rate.

The present disclosure takes into account the anti-lock mode on the basis of the two modes and cadence braking is turned on through a low-frequency opening and closing of the digital switch valve, which achieves an effect of emergency braking, ensures the safety of the driving vehicle, increases the versatility of the braking system. The braking modes can be switched independently and intelligently through the controller.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which the same reference numbers represent the same structures, wherein.

In the figures, 1—two-position three-way digital switch valve, 2—accumulator, and 3—electromagnetic three-position three-way proportional reversing valve.

DETAILED DESCRIPTION

The present disclosure will be further elaborated and described as follow in combination with specific embodiments. The embodiments are merely examples of the present disclosure and do not make a limitation to the scope of the present disclosure. The technical features of the various implementations in the present disclosure may be combined accordingly on the premise that there is no conflict with each other.

Figure 1:
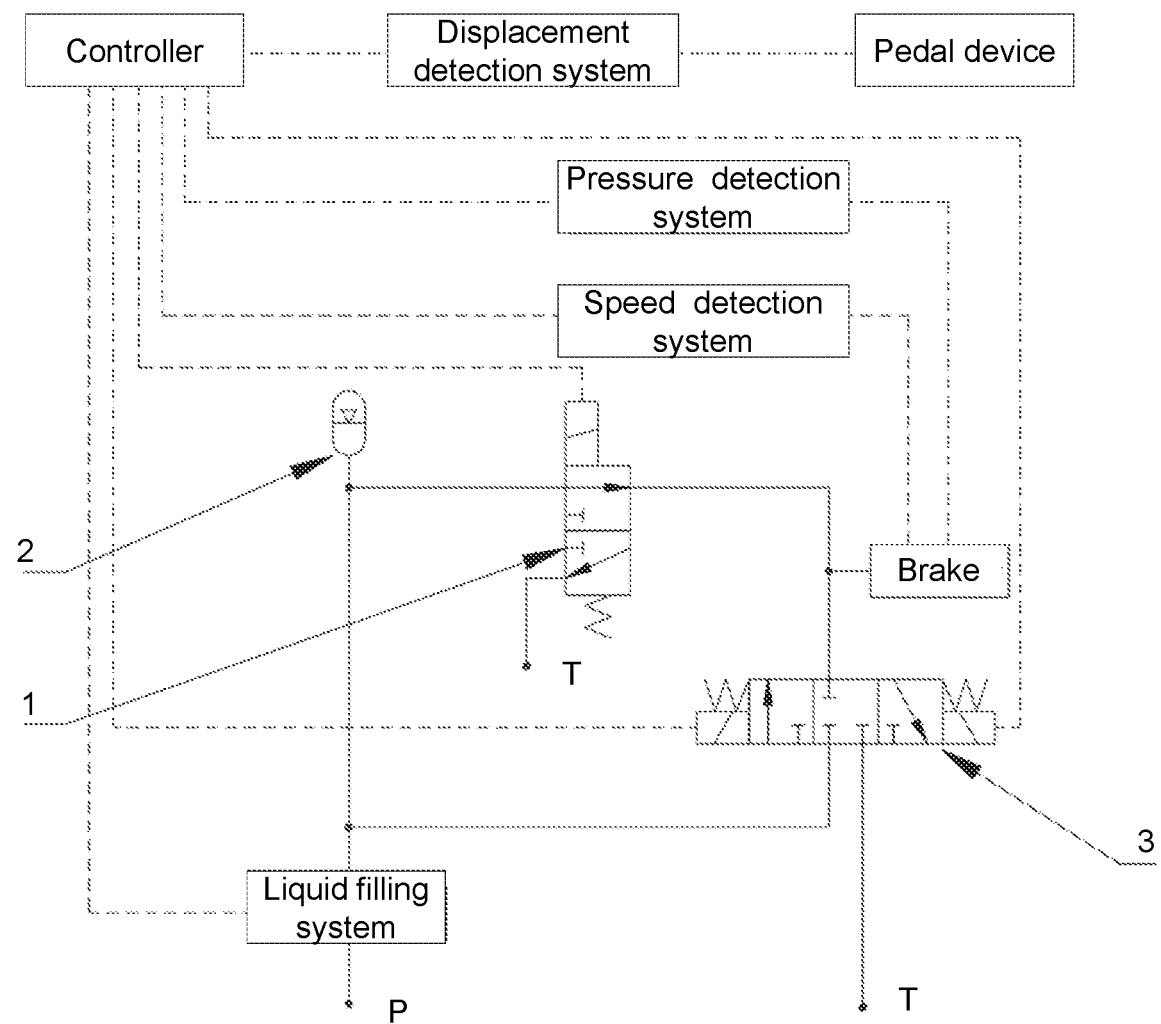
FIG. 1 is a schematic diagram illustrating a principle of a multi-mode hydraulic braking system according to some embodiments of the present disclosure.

As shown in FIG. 1, a multi-mode hydraulic braking system of the embodiment includes a two-position three-way digital switch valve 1, an electromagnetic three-position three-way proportional reversing valve 3, a controller, a pressure detection system, a speed detection system, and a displacement detection system.

The controller is respectively connected to the displacement detection system, pressure detection system, and speed detection system to obtain detection signals corresponding to the displacement detection system, the pressure detection system, and the speed detection system. The controller is connected to the electromagnetic three-position three-way proportional reversing valve 3 and the two-position three-way digital switch valve 1 to respectively control the electromagnetic three-position three-way proportional reversing valve and the two-position three-way digital switch valve, and the controller is also configured to control an external liquid filling system. The controller transmits an input signal $\alpha$ (i.e., control signal $\alpha$) to the liquid filling system, a duty cycle modulation signal $\beta$ (i.e., duty cycle $\beta$) (0%-100%) and driving frequency signals $f_1$ and $f_2$ to the digital switch valve, and a valve opening $\gamma$ to the proportional valve.

The displacement detection system is configured to obtain a displacement signal of an external pedal device. The pressure detection system is configured to obtain a brake oil chamber pressure signal of an external brake. The speed detection system is configured to obtain a wheel speed.

Oil inlets of the electromagnetic three-position three-way proportional reversing valve and the two-position three-way digital switch valve are connected to the external liquid filling system. The oil inlet of the two-position three-way digital switch valve 1 is also connected to the accumulator 2. Oil outlets of the electromagnetic three-position three-way proportional reversing valve 3 and the two-position three-way digital switch valve 1 are connected to a brake oil chamber of the external brake. Oil return ports of the electromagnetic three-position three-way proportional reversing valve 3 and the two-position three-way digital switch valve 1 are connected to an external oil tank.

In a specific embodiment of the present disclosure, the liquid filling system is to fill the accumulator with liquid to guarantee that the accumulator can provide a sufficient brake pressure. When the pressure of the accumulator detected by the controller is insufficient, the controller transmits the control signal $\alpha$ to the liquid filling system and the liquid filling system fills the accumulator with liquid to replenish the pressure.

The controller intelligently switches three braking operating modes: a digital braking mode, a composite braking mode, and an anti-lock braking mode after collecting the signal of the brake through the pressure detection system and speed detection system in real time.

A target brake pressure $P_0$ is determined by a stroke of the pedal device, that is, the greater the stroke distance is, the greater the target brake pressure $P_0$ is (target brake pressure $P_0 \leq$ lock pressure $P_1$).

The control method of the multi-mode hydraulic braking system of the present disclosure is illustrated as follows.

The controller collects the detection signals corresponding to the displacement detection system, the pressure detection system, and the speed detection system in real time through the displacement detection system, the pressure detection system, and the speed detection system. The pressure detection system detects the brake oil chamber pressure of the brake. The speed detection system detects the wheel speed and a driving speed of the vehicle may be obtained through an internal conversion of the detection system.

When the controller receives a braking command signal of the displacement detection system, the controller determines a current brake pressure (i.e., current brake oil chamber pressure signal) according to a feedback signal of the pressure detection system and the speed detection system.

Operating Mode 1 (Digital Braking Mode)

Figure 2:
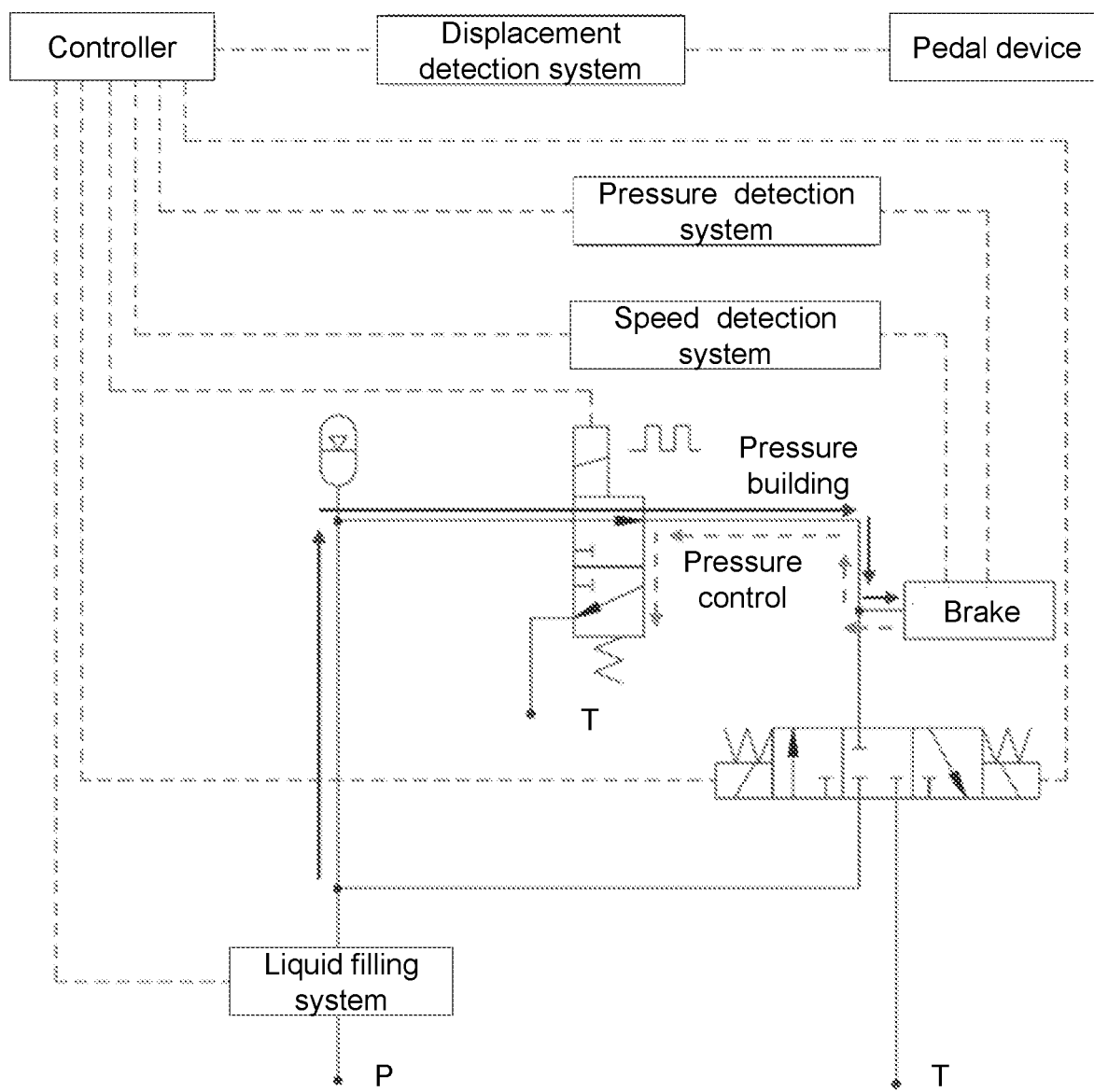
FIG. 2 is a schematic diagram illustrating a digital control mode according to some embodiments of the present disclosure.
Figure 4:
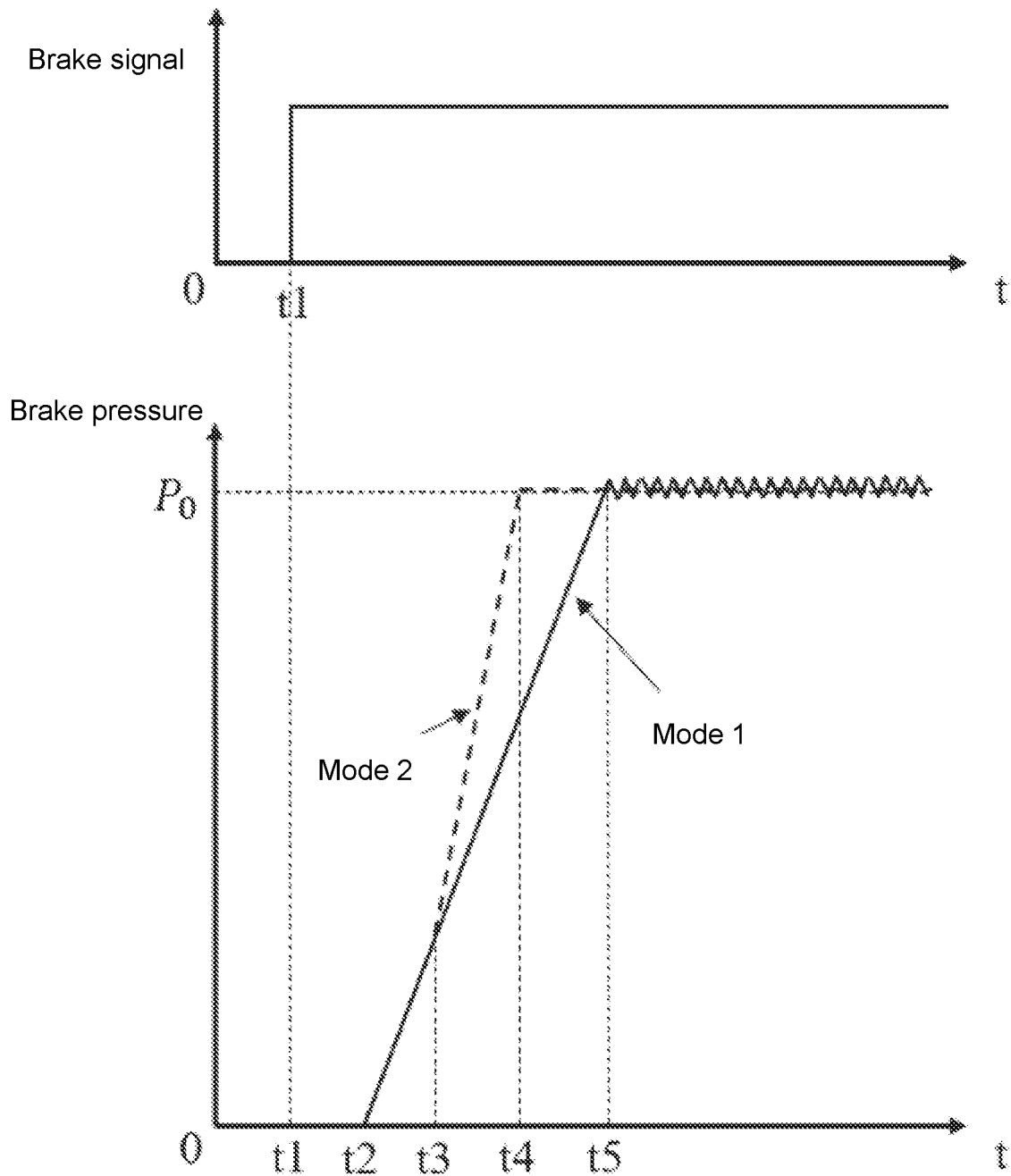
FIG. 4 is a comparison diagram illustrating a control system building pressure in the digital control mode and composite control mode according to some embodiments of the present disclosure.

As shown in FIG. 2, the operating mode 1 is a control mode of digital pressure building and digital pressure control. When the controller receives the braking command signal of the displacement detection system, the controller determines the current brake pressure according to the feedback signal of the pressure detection system. After the internal operation of the controller, when the current brake pressure is detected to meet a "light load" threshold (a selected threshold value within 6 Mpa-12 Mpa), the controller transmits a first optimal driving frequency $f_1$ (100 Hz-300 Hz) and a first optimal duty cycle $\beta$ (0%-100%) to the digital switch valve at time t1. At this time, the controller transmits a valve opening $\gamma$ to keep the proportional valve in median function. Because of a short response lag time and a high frequency response of the digital switch valve, pressure building is started at time t2. However, an output flow rate of the digital switch valve is small and the whole pressure building process is relatively long compared to mode 2 (as shown in FIG. 4).

When pressure building is started in the operating mode 1, the oil is first input from a port P and input to the brake through the digital switch valve of the high-frequency driving frequency $f_1$ and the duty cycle modulation $\beta$. When the brake pressure reaches a target brake pressure $P_0$, the controller calculates a second optimal driving frequency $f_1'$ (100 Hz-300 Hz) and a second duty cycle $\beta'$ again and excess oil returns to the port T through the digital switch valve to stabilize the brake pressure at the target brake pressure $P_0$ to achieve precise regulation of the brake pressure.

Operating Mode 2 (Composite Braking Mode)

Figure 3:
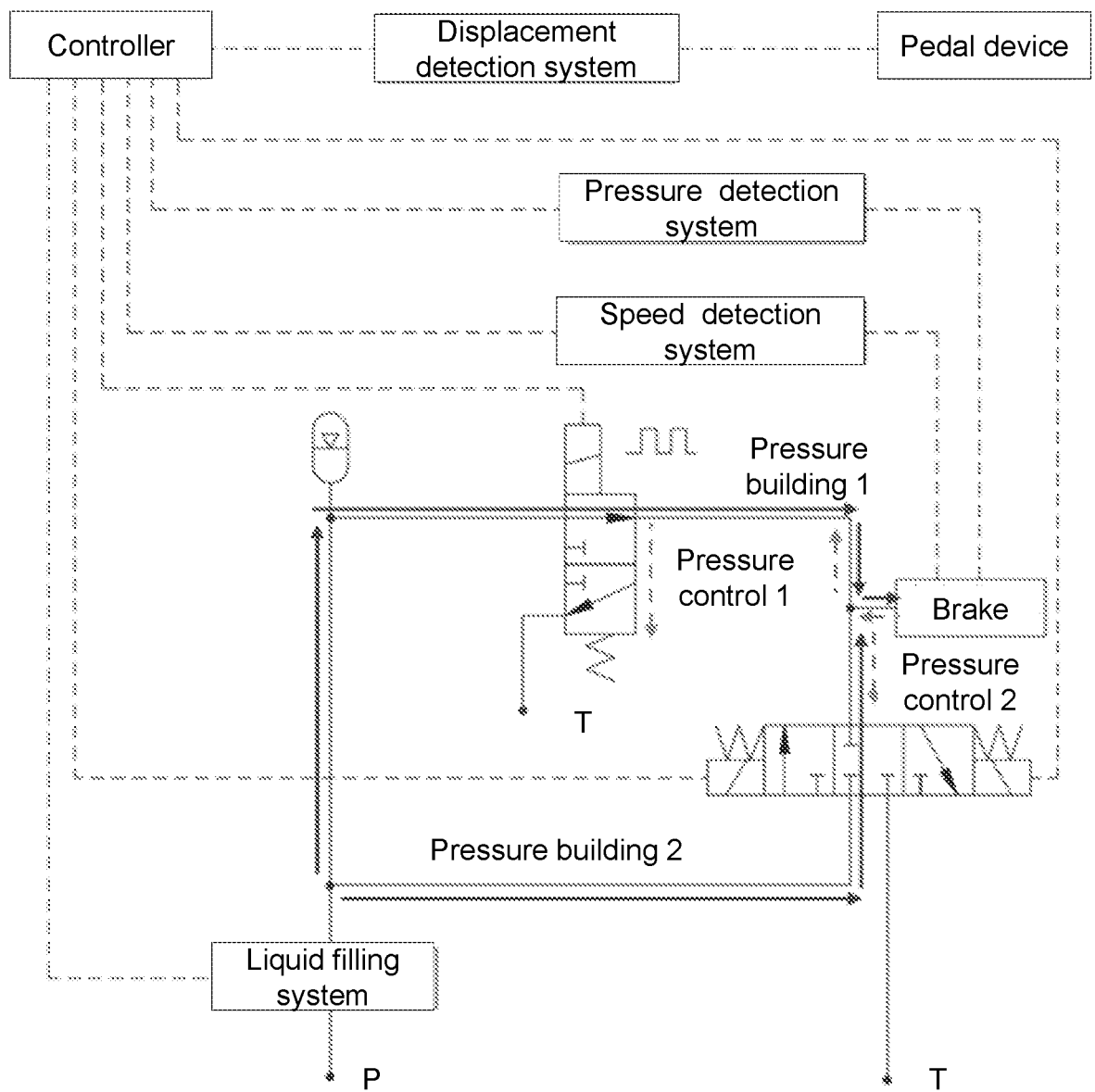
FIG. 3 is a schematic diagram illustrating a composite control mode according to some embodiments of the present disclosure.

As shown in FIG. 3, the operating mode 2 is a control mode of digital/proportional composite pressure building and digital/proportional composite pressure control. When the controller receives the braking command signal of the displacement detection system, the controller determines the current brake pressure according to the feedback signal of the pressure detection system. After the internal operation of the controller, when the current brake pressure is detected to meet a "heavy load" threshold (the heavy load threshold is greater than 12 Mpa, which is selected according to a specific situation), the control transmits the first optimal driving frequency $f_1$ (100 Hz-300 Hz) and the first optimal duty cycle $\beta$ (0%-100%) to the digital switch valve at time t1. The controller adjusts the valve opening $\gamma$ of an oil inlet line of the proportional valve and calculates a size of the optimal valve opening $\gamma$. Because of the short response lag time and the high frequency response of the digital switch valve, pressure building is started at time t2. At the same time, the proportional valve starts to respond and participates in the braking and pressure building after crossing a dead zone and the oil is pooled into the brake through the digital switch valve and the proportional valve for pressure braking with a great flow rate (as shown in FIG. 4).

When pressure building is started in the operating mode 2, the oil is first input from the port P, divided into two lines, and the two lines of oil finally enters the brake after one line passes through the digital switch valve of the high frequency $f_1$ and the duty cycle modulation $\beta$ and the other line passes through the proportional valve. When the brake pressure reaches the target brake pressure $P_0$, the controller again calculates the second optimal duty cycle $\beta'$, the second optimal driving frequency $f_1'$, and the optimal valve opening $\gamma'$ of the proportional valve in real time through the pressure detection system and the speed detection system, so that the excess oil enters the oil return port T to achieve high dynamic response and high precision control of the target brake pressure $P_0$.

Operating Mode 3 (Anti-Lock Braking Mode)

When the brake pressure is too great and reaches a lock pressure $P_1$, a series of safety accidents such as tire blowout, drift, and rollover are caused. Operating mode 3 is to add an anti-lock function on the basis of operating modes 1 and 2. When in the digital braking mode and when the controller detects that the brake pressure reaches $P_1$ and the speed detection system detects an emergency brake signal (a vehicle movement speed is reduced to smaller than 20% of an original movement speed within 1.5 s), the anti-lock mode is activated. The controller transmits an optimal low-frequency driving frequency $f_2$ (10 Hz-20 Hz) and a third duty cycle $\beta''$ to the digital switch valve and cadence braking is turned on for emergency braking.

Similarly, when in the composite braking mode and when the controller detects that the brake pressure reaches $P_1$ and the speed detection system detects an emergency brake signal (a vehicle movement speed is reduced to smaller than 20% of an original movement speed within 1.5 s), the anti-lock mode is activated. The controller transmits the valve opening $\gamma$ to the proportional valve to keep the proportional valve in median function. The controller transmits the optimal low-frequency driving frequency $f_2$ (10 Hz-20 Hz) and the third duty cycle $\beta''$ to the digital switch valve after calculation and cadence braking being turned on for emergency braking.

If the target brake pressure is $P_0$, a comparison effect of pressure building of the braking system of the present disclosure in the digital control mode and the composite control mode is shown in FIG. 4.

Mode 1: When the controller receives the braking signal at time t1, the pressure building is started at time t2. At this time, the digital switch valve responds at a high frequency. When the brake pressure reaches the target brake pressure $P_0$ at time t5, the controller regulates the duty cycle $\beta$ and the driving frequency $f_1$ of the digital switch valve in real time for precise pressure control to keep the brake pressure remain $P_0$.

Mode 2: When the controller receives the braking signal at time t1, pressure building is also started at time t2 because a response speed of the digital switch valve is much greater than that of the proportional valve. At the same time, the proportional valve also starts to respond and builds pressure together with the digital switch valve after crossing the dead zone at time t3. When the brake pressure reaches the target brake pressure $P_0$ at time t4, the controller regulates the duty cycle $\beta$ of the digital switch valve and the valve opening of the proportional valve $\gamma$ in real time for precise pressure control to keep the brake pressure remain $P_0$.

Figure 5:
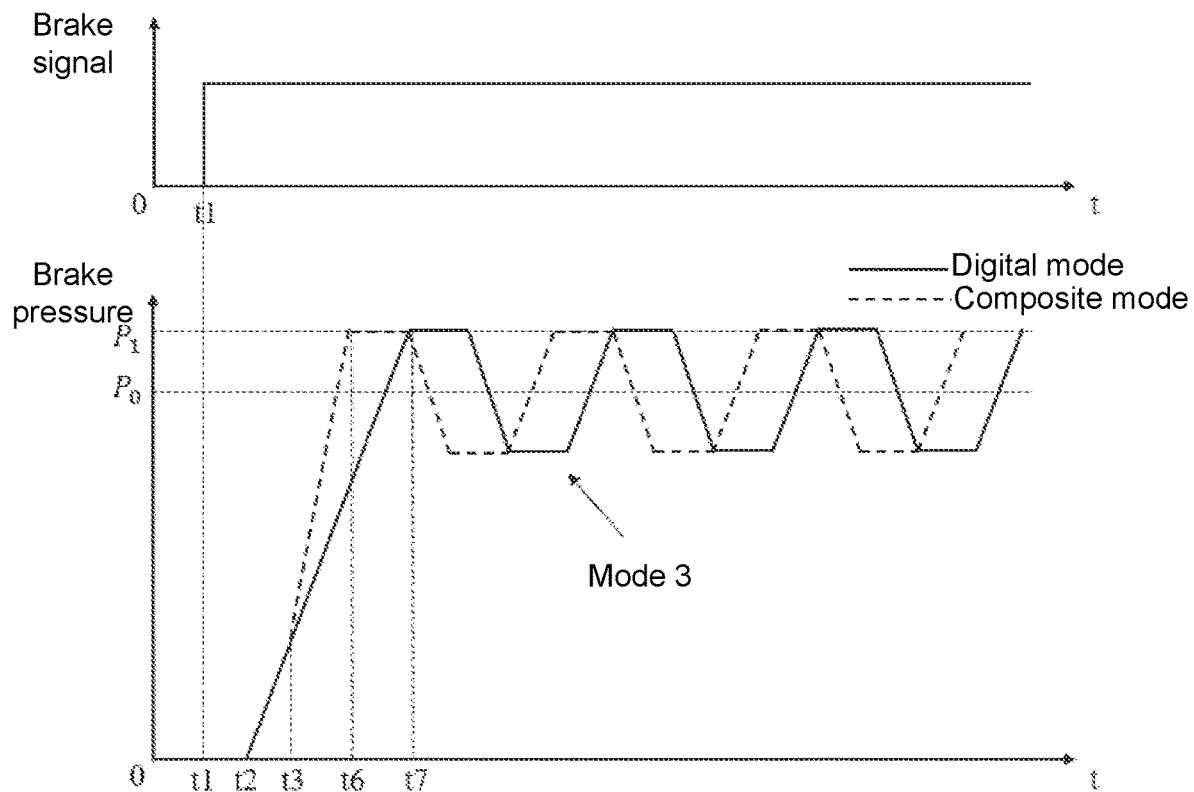
FIG. 5 is a comparison diagram illustrating the control system controlling pressure in an anti-lock mode according to some embodiments of the present disclosure.

A comparative effect of pressure control of the braking system of the present disclosure in the operating mode 3 (i.e., the anti-lock mode) is shown in FIG. 5.

Mode 3: In the digital operating mode, when the brake pressure reaches the lock pressure $P_1$ at time t7, the anti-lock mode is activated and cadence braking is performed on the wheel for emergency braking through a low-frequency opening and closing of the digital switch valve. Similarly, in the composite mode, when the brake pressure reaches the lock pressure $P_1$ at time t6, the anti-lock mode is activated. The proportional valve is closed so that the oil inlet and oil outlet are closed. Cadence braking is performed on the wheel for emergency braking through a low-frequency opening and closing of the digital switch valve.

In the present disclosure, an electro-hydraulic proportional control technology with an electromagnetic three-position three-way reversing valve as a control element is integrated with a digital hydraulic technology with a digital switch valve as a control element and the anti-lock function is taken into account on the basis of digital and composite braking modes, which ensures the safety of emergency braking. The operating modes are intelligently switched through the controller, which improves the versatility of the braking system.

In some embodiments, in the comparison diagram of pressure building of the control system shown in FIG. 4, the target brake pressures corresponding to the operating mode 1 and the operating mode 2 may be equal (e.g., $P_0$) or similar. In some embodiments, a target brake pressure $P_0'$ corresponding to the operating mode 2 may be greater than the target brake pressure $P_0$ corresponding to the operating mode 1 in the comparison diagram of pressure building of the control system shown in FIG. 6.

In some embodiments, the target brake pressure may be determined by a stroke of the pedal device, that is, the greater the stroke distance is, the greater the target brake pressure is (target brake pressure lock pressure $P_1$). In some embodiments, the pressure detection system may detect a brake oil chamber pressure of the brake. The pressure of the brake oil chamber may be positively correlated with the stroke distance of the pedal device, that is, the greater the stroke distance of the pedal device is, the greater the corresponding brake oil chamber pressure is. In some embodiments, when the "heavy load" threshold corresponding to the operating mode 2 is greater than the "light load" threshold corresponding to the operating mode 1, that is, the brake oil chamber pressure corresponding to the operating mode 2 is greater than that of the operating mode 1; accordingly, the stroke distance of the pedal device corresponding to the operating mode 2 is greater than that of the pedal device corresponding to the operating mode 1, so that the target brake pressure $P_0'$ corresponding to the operating mode 2 is greater than the target brake pressure $P_0$ corresponding to the operating mode 1.

Figure 6:
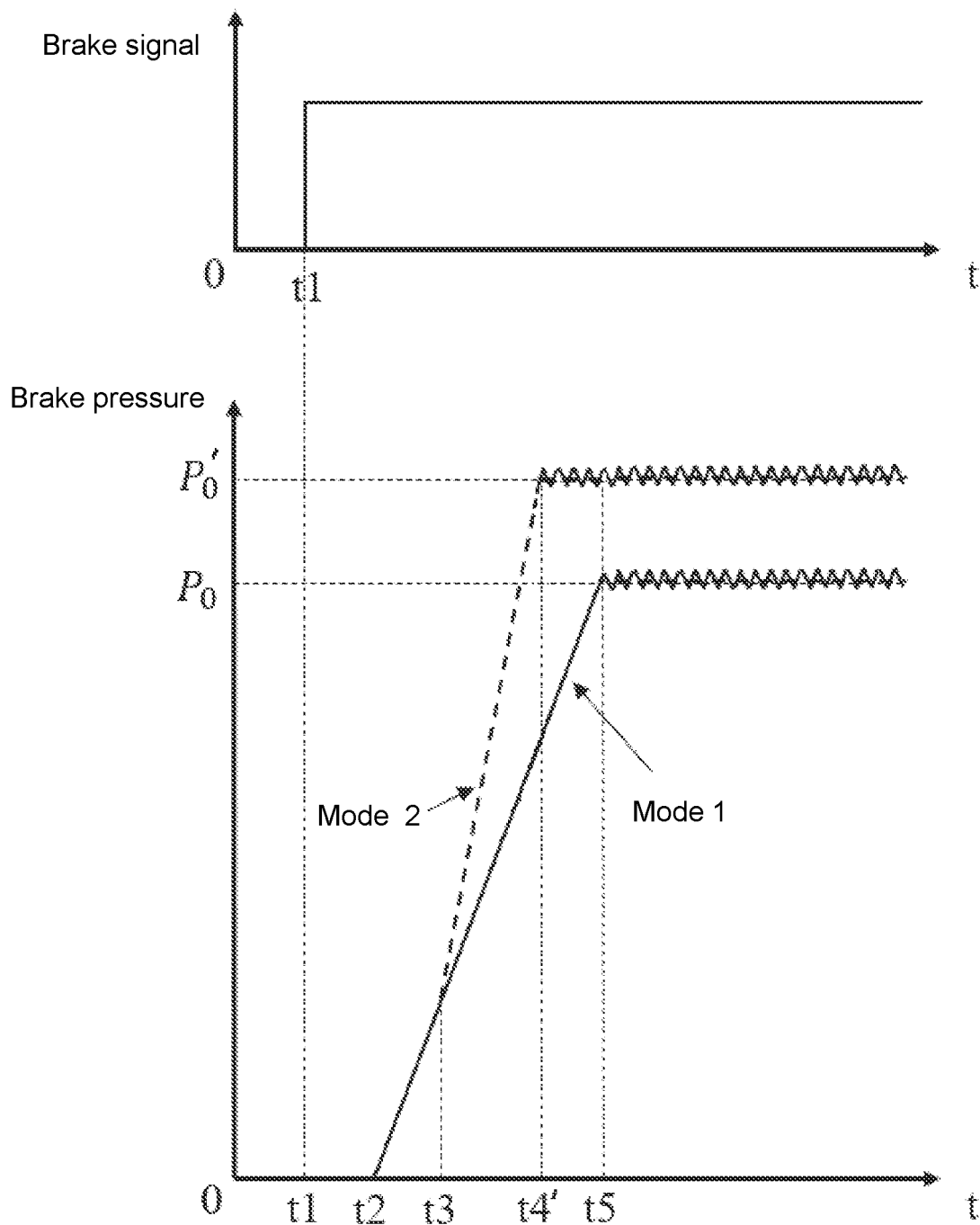
FIG. 6 is a comparison diagram illustrating the control system building pressure with different target brake pressures in the digital control mode and composite control mode according to some embodiments of the present disclosure.

When the target brake pressure $P_0'$ corresponding to the operating mode 2 is greater than the target brake pressure $P_0$ corresponding to the operating mode 1, a comparison effect of pressure building of the braking system of the present disclosure in the digital control mode and the composite control mode is shown in FIG. 6.

Mode 1: When the controller receives the braking signal at time t1, the pressure building is started at time t2. At this time, the digital switch valve responds at a high frequency. When the brake pressure reaches the target brake pressure $P_0$ at time t5, the controller regulates the duty cycle $\beta$ and the driving frequency $f_1$ of the digital switch valve in real time for precise pressure control to keep the brake pressure remain $P_0$.

Mode 2: When the controller receives the braking signal at time t1, pressure building is also started at time t2 because a response speed of the digital switch valve is much greater than that of the proportional valve. At the same time, the proportional valve also starts to respond and builds pressure together with the digital switch valve after crossing the dead zone at time t3. When the brake pressure reaches the target brake pressure $P_0'$ at time t4' (t4' is greater than t4), the controller regulates the duty cycle $\beta$ of the digital switch valve and the valve opening of the proportional valve $\gamma$ in real time for precise pressure control to keep the brake pressure remain $P_0'$.

In some embodiments, the controller may determine the operating mode 1 or the operating mode 2 for braking and pressure building based on other ways.

In some embodiments, the controller may determine the braking mode based on a current speed of a vehicle. For example, when the current speed of the vehicle is greater than a first preset threshold, it is necessary to reach the target brake pressure faster and the controller can choose the operating mode 1 to brake and build pressure; When the current speed of the vehicle is smaller than or equal to the first preset threshold, the controller can select the operating mode 1 to brake and build pressure.

In some embodiments, the controller may determine the braking mode based on selection of a user (a driver of the vehicle). For example, the vehicle may provide a quick response braking mode (corresponding to the operating mode 2) and an ordinary braking mode (corresponding to the operating mode 1) for the user to choose. The controller may determine the braking mode based on a selection result of the user.

In some embodiments, the controller may determine the braking mode based on a driving mode of the vehicle. For example, when the vehicle is in a normal driving mode, the controller may select the operating mode 1 to brake and build pressure; When the vehicle is in a sport driving mode, the controller may select the operating mode 2 to brake and build pressure.

In some embodiments, the controller may determine the braking mode based on acceleration of brake pedal stroke change. For example, when the acceleration of brake pedal stroke change is greater than a second preset threshold, it means that the user presses the brake pedal relatively fast, the braking demand may be relatively urgent, and a faster braking response is necessary. At this time, the controller may choose the operating mode 2 to build the brake pressure. When the acceleration of brake pedal stroke change is smaller than or equal to the second preset threshold, the controller may select the operating mode 1 to brake and build pressure.

In some embodiments, the controller may comprehensively determine the braking mode according to various parameters. The various parameters may include the current brake pressure, the current vehicle speed, and the acceleration of brake pedal stroke change. In some embodiments, the various parameters may be expressed as (a1, a2, a3, . . . ) in the form of parameter vectors, where a1 represents the current brake pressure, a2 represents the current vehicle speed, a3 represents the acceleration of brake pedal stroke change, etc.

In some embodiments, the controller may determine the braking mode of the vehicle based on vector database matching. The vector database refers to a database used to store, index, and query vectors. Through the vector database, similarity query and other vector management may be carried out quickly in the face of a large number of vectors. In some embodiments, the vector database may include reference vectors composed of a plurality of sets of historical brake pressure, historical vehicle speed, acceleration of historical brake pedal stroke change, and corresponding recommended braking modes (e.g., the operating mode 1 or the operating mode 2). The recommended braking mode may be determined by experts or according to experiments, which may effectively ensure safety and braking system performance. In some embodiments, the controller may match the reference vector meeting a preset condition from the vector database according to a current parameter vector and determine the recommended braking mode corresponding to the reference vector as a current braking mode. The preset condition may include that a distance (e.g., a cosine distance, a Euclidean distance, a Manhattan distance, a Chebyshev distance, etc.) between the reference vector and the current parameter vector is minimum or meets a preset threshold.

In some embodiments, the controller may also determine the braking mode in other ways based on the various parameters. For example, the controller may determine the braking mode through a machine learning model according to the various parameters of the vehicle and braking.

In one or more embodiments of the present disclosure, the controller may determine the braking mode in various ways, which can meet the braking demand and provide better driving experience to the user.

The above embodiments only express several implementation modes of the present disclosure and the description thereof is relatively specific and detailed. However, the embodiments should not be understood as a limitation of the patent scope of the present disclosure. For those skilled in the art, several modifications and improvements can be made without departing from the concept of the present disclosure and the modifications and improvements all belong to the protection scope of the present disclosure.

What is claimed is:

1. A control method of a multi-mode hydraulic braking system, the multi-mode hydraulic braking system comprising a two-position three-way digital switch valve, an electromagnetic three-position three-way proportional reversing valve, a controller, a pressure detection system, a speed detection system, and a displacement detection system, wherein the controller is respectively connected to the displacement detection system, the pressure detection system, and the speed detection system to obtain detection signals corresponding to the displacement detection system, the pressure detection system, and the speed detection system, the controller is connected to the electromagnetic three-position three-way proportional reversing valve and the two-position three-way digital switch valve to respectively control the electromagnetic three-position three-way proportional reversing valve and the two-position three-way digital switch valve, and the controller is also configured to control an external liquid filling system;

the displacement detection system is configured to obtain a displacement signal of an external pedal device, the pressure detection system is configured to obtain a brake oil chamber pressure signal of an external brake, and the speed detection system is configured to obtain a wheel speed;

oil inlets of the electromagnetic three-position three-way proportional reversing valve and the two-position three-way digital switch valve are connected to the external liquid filling system, the oil inlet of the two-position three-way digital switch valve is also connected to an accumulator, oil outlets of the electromagnetic three-position three-way proportional reversing valve and the two-position three-way digital switch valve are connected to a brake oil chamber of the external brake, and oil return ports of the electromagnetic three-position three-way proportional reversing valve and the two-position three-way digital switch valve are connected to an external oil tank; and the control method of a multi-mode hydraulic braking system comprises:

1) The controller collecting the detection signals corresponding to the displacement detection system, the pressure detection system, and the speed detection system in real time through the displacement detection system, the pressure detection system, and the speed detection system;
2) The controller determining a current brake oil chamber pressure signal according to a feedback signal of the pressure detection system when the controller receives a braking command signal of the displacement detection system;
2.1) the controller transmitting an optimal driving frequency $f_1$ and an optimal duty cycle $\beta$ to the digital switch valve at time t1 when determining that the current brake oil chamber pressure signal meets a set light load threshold and the controller transmitting a valve opening $\gamma$ to keep the proportional valve in median function;
pressure building being started at time t2 because of a short response lag time and a high frequency response of the digital switch valve, the oil being first input from a port P of the digital switch valve and input to the brake through the digital switch valve; the controller calculating a current optimal driving frequency $f_1'$ and a duty cycle $\beta'$ of the digital switch valve when a brake pressure reaches a target brake pressure $P_0$ and excess oil returning to the oil tank through the oil return port T of the digital switch valve to stabilize the brake chamber pressure at the target brake pressure $P_0$ to achieve precise regulation of the brake pressure;
2.2) the controller transmitting the optimal driving frequency $f_1$ and the optimal duty cycle $\beta$ to the digital switch valve at time t1 when determining that the current brake pressure meets a set heavy load threshold and the controller transmitting the valve opening $\gamma$ to adjust a size of the valve opening of an oil inlet line of the proportional valve;
pressure building being started at time t2 because of the short response lag time and the high frequency response of the digital switch valve; at the same time, the proportional valve starting to respond and participating in braking and pressure building after crossing a dead zone, the oil being divided into two lines, and the two lines of oil finally entering the brake after one line passes through the digital switch valve and the other line passes through the proportional valve; and the controller calculating the current optimal driving frequency $f_1'$ and the duty cycle $\beta'$ of the digital switch valve and an optimal valve opening $\gamma'$ of the proportional valve when the brake pressure reaches the target brake pressure $P_0$ and the excess oil returning to the oil tank through the oil return port to achieve high dynamic response and high precision control of the target brake pressure $P_0$;
2.3) in the operating mode of 2.1), an anti-lock mode being activated when the controller detects that the brake pressure is too great and reaches a lock pressure $P_1$ and the speed detection system detects an emergency brake signal, the controller transmitting an optimal low-frequency driving frequency $f_2$ and a duty cycle $\beta$ to the digital switch valve, and cadence braking being turned on for emergency braking;
in the operating mode 2.2), the anti-lock mode being activated when the controller detects that the brake pressure is too great and reaches the lock pressure $P_1$ and the speed detection system detects the emergency brake signal, the controller transmitting the valve opening $\gamma$ to the proportional valve to keep the proportional valve in median function, the controller transmitting the optimal low-frequency driving frequency $f_2$ and the duty cycle $\beta$ to the digital switch valve, and cadence braking being turned on for emergency braking.

2. The control method of a multi-mode hydraulic braking system of claim 1, wherein the controller is further configured to obtain a pressure signal of the external accumulator.

3. The control method of a multi-mode hydraulic braking system of claim 1, wherein in the operating modes 2.1) and 2.2), the driving frequencies $f_1$ and $f_1'$ are in a range of 100 Hz-300 Hz and the duty cycles $\beta$ and $\beta'$ are in a range of 0%-100%.

4. The control method of a multi-mode hydraulic braking system of claim 1, wherein in the operating mode 2.3), the driving frequency $f_2$ is in a range of 10 Hz-20 Hz.

5. The control method of the multi-mode hydraulic braking system of claim 1, wherein a selection interval of the light load threshold is 6 MPa-12 MPa, a selection interval of the heavy load threshold is greater than 12 MPa, and the emergency brake signal means that a vehicle movement speed is reduced to smaller than 20% of an original movement speed within 1.5 s.

6. The control method of the multi-mode hydraulic braking system of claim 1, wherein when a pressure of the accumulator detected by the controller is inadequate, the controller transmits a control signal $\alpha$ to the liquid filling system and the liquid filling system fills the accumulator with liquid to supplement the pressure.

* * * * *